United States Patent [19]

Umezaki et al.

[11] Patent Number: 5,575,964
[45] Date of Patent: Nov. 19, 1996

[54] METHOD FOR PRODUCING SILICA-ALUMINA FIBER

[75] Inventors: Hiroshi Umezaki; Yasuyuki Oki; Ken Shimada, all of Niihama, Japan

[73] Assignee: Sumitomo Chemical Company, Limited, Osaka, Japan

[21] Appl. No.: 292,185

[22] Filed: Aug. 18, 1994

[30] Foreign Application Priority Data

Aug. 19, 1993  [JP]  Japan ................................. 5-204960

[51] Int. Cl.$^6$ ................................................. B29C 47/88
[52] U.S. Cl. ..................................... 264/60; 264/211.12
[58] Field of Search ................................ 264/60, 211.11, 264/211.12

[56] References Cited

U.S. PATENT DOCUMENTS

| | | | |
|---|---|---|---|
| 4,101,615 | 7/1978 | Horikiri et al. | 264/63 |
| 4,495,121 | 1/1985 | Horikiri et al. | 264/56 |
| 4,961,889 | 10/1990 | Kadokura et al. | 264/63 |
| 5,133,918 | 7/1992 | Jung et al. | 264/211.11 |

FOREIGN PATENT DOCUMENTS

| | | |
|---|---|---|
| 0181403 | 5/1986 | European Pat. Off. . |
| 0283176 | 9/1988 | European Pat. Off. . |
| 62-49362 | 10/1987 | Japan . |
| 3-104925 | 5/1991 | Japan . |
| 6-11646 | 2/1994 | Japan . |
| 9201644 | 2/1992 | WIPO . |

*Primary Examiner*—Christopher A. Fiorilla
*Attorney, Agent, or Firm*—Birch, Stewart, Kolasch & Birch, LLP

[57] ABSTRACT

Silica-alumina fibers having good mechanical strength and heat resistance are produced by mixing a polyaluminoxane which comprises repeating units of the formula:

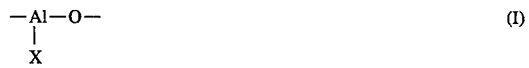

in which X is an alkyl group, an alkoxy group or a hydroxy group, a silicon-containing compound in an amount of not larger than 40% by weight in terms of silica based on the weight of silica-alumina fibers to be produced, and an aliphatic carboxylic acid having 2 to 14 carbon atoms in an alkyl group in an amount of 0.03 to 0.4 mole per one gram atom of aluminum to obtain a spinning liquid, spinning the spinning liquid under a condition that a content of nonvolatile materials in the solution is maintained at least 97% by weight to form precursor fibers, and calcining the precursor fibers.

14 Claims, No Drawings

METHOD FOR PRODUCING SILICA-ALUMINA FIBER

BACKGROUND OF THE INVENTION

1. Field of the Invention

The present invention relates to a method for producing a silica-alumina fiber. In particular, the present invention relates to a method for producing silica-alumina fibers comprising steps mixing polyaluminoxane with a specific amount of a silicon-containing compound and a specific aliphatic carboxylic acid, spinning the resulting spinning liquid to obtain a precursor fiber and calcining the precursor fiber to obtain a silica-alumina fiber having good mechanical strength and heat resistance, which method is excellent in spinnability and spinning.

2. Description of the Related Art

As methods for producing a silica-alumina fiber, there are known an inorganic salt method, a slurry method, a sol-gel method and a precursor polymer method.

The inorganic salt method comprises the steps of adding a water-soluble polymer such as polyethylene oxide of polyvinyl alcohol to an aqueous solution of an aluminum salt, mixing water-soluble polysiloxane or silica sol in the solution, and condensing and heat aging the solution to obtain a viscous spinning solution. Since this method imparts the viscosity to the solution by the water-soluble organic polymer, the solution is gelled in the preparation step of the solution, so that the spinning solution lacks stability.

The slurry method add a crystalline growth suppressing agent, a binder component and an organic polymer such as polyethylene oxide to fine alumina particles and uses the resulting viscous slurry as a spinning liquid. In this method, since a particle size of the solid particles, their amounts and a state of dispersion have influences on the spinning property and the mechanical properties of the spun fiber, their control is very difficult.

The sol-gel method condenses an alumina sol containing an ion such as $HCOO^-$ or $CH_3COO^-$ and a silica sol to form a viscous spinning liquid. In this method, since the components tend to precipitate, the solution becomes turbid or the viscosity suddenly increases in the condensation step, the control of condensation is difficult.

The precursor polymer method prepares a spinning liquid by mixing a silicon-containing compound such as a silicate ester with polyaluminoxane. In this method, since homogeneity of the spinning liquid is high and neither the organic polymer nor the binder is necessary, the obtained fiber is characterized in its high mechanical strength. But, since the polyaluminoxane is easily hydrolyzed, the spinning stability is low, and the strength of the obtained fiber varies greatly. Then, a modified precursor polymer method is proposed. For example, in the method disclosed in Japanese Patent Publication No. 13768/1976, polyaluminoxane and a silicon-containing compound are mixed in the presence of a solvent to obtain a spinning liquid containing 50 to 60 % by weight of the polyaluminoxane, spinning the spinning liquid and calcining the spun fiber. In particular, this Patent describes that the spinnability is improved by the addition of an organic polymer such as polyethylene glycol, polyvinyl formal and the like or a higher aliphatic carboxylic acid such as stearic acid, palmitic acid and the like to the spinning liquid.

Japanese Patent Publication No. 49362/1987 discloses that polymetalloxane having a phenoxy group improves the spinnability of the spinning liquid greatly.

However, since the spinning liquids used in the methods of U.S. Pat. No. 4,101,615 and Japanese Patent Publication No. 49362/1987 contain a large amount of a solvent, they have some problems that control of the viscosity of spinning liquid is difficult so that the spinning liquid may not be stably spun, and that the precursor fibers stick to each other during the spinning so that the mechanical properties of the obtained fibers fluctuate. In addition, volatilized solvents should be collected during the ,spinning, or it is necessary to provide a drying step for removing the solvent from the precursor fibers. Thereby, the production cost is increased.

SUMMARY OF THE INVENTION

An object of the present invention is to provide a method for producing silica-alumina fibers, which has good spinning stability not only in the production of short fibers but also in the production of long fibers.

Another object of the present invention is to provide a method for producing silica-alumina fibers having good mechanical strength and heat resistance economically.

According to the present invention, there is provided a method for producing silica-alumina fibers comprising steps of mixing a polyaluminoxane which comprises repeating units of the formula:

wherein X is an alkyl group, an alkoxy group or a hydroxy group, a silicon-containing compound in an amount of not larger than 40% by weight in terms of silica based on the weight of silica-alumina fibers to be produced, and an aliphatic carboxylic acid of the formula:

wherein R is an alkyl group having 2 to 14 carbon atoms in an amount of 0.03 to 0.4 mole per one gram atom of aluminum to obtain a spinning liquid, spinning the spinning liquid under a condition that a content of non-volatile materials in the solution is maintained at least 97% by weight to form precursor fibers, and calcining the precursor fibers to obtain silica-alumina fibers.

DETAILED DESCRIPTION OF THE INVENTION

In the polyaluminoxane comprising the repeating units of the formula (I), X is preferably a hydroxy group, an alkyl group having 1 to 4 carbon atoms such as a methyl group, an ethyl group, a n-propyl group, an isopropyl group, a n-butyl group, an isobutyl group and a tert.-butyl group, and an alkoxy group having 1 to 4 carbon atoms such as a methoxy group, an ethoxy group, a n-propoxy group, an isopropoxy group, a n-butoxy group, an isobutoxy group, a sec.butoxy group and a tert.-butoxy group.

A Polymerization degree of the polyaluminoxane comprising the repeating units of the formula (I) is preferably from 2 to 1000, more preferably from 3 to 500.

The polyaluminoxane comprising the repeating units of the formula (I) in which X is an alkyl or alkoxy group may be prepared by hydrolyzing an alkylaluminum or alkoxyaluminum with 0.5 to 1.5 mole of water per one gram atom of aluminum.

A preferred example of the silicon-containing compound to be used in the present invention is a polysilicate ester comprising repeating units of the formula:

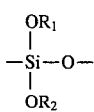

wherein $R_1$ and $R_2$ are independently an organic group, while an organosilane of the formula:

wherein X is OH or OR, R is an organic group, and n is an integer of 0 to 4 or other silicon-containing compounds may be used.

Examples of the organic group for $R_1$, $R_2$ and R are alkyl groups having 1 to 4 carbon atoms such as a methyl group, an ethyl group, a n-propyl group, an isopropyl group, a n-butyl group and a tert.-butyl group.

Specific examples of the polysilicate ester are polyethyl silicate, polyisopropyl silicate, and the like.

Among the silicon-containing compounds, the compounds which can be homogeneously dissolved in the polyaluminoxane comprising the repeating units of the formula (I) are preferred in view of spinnability, while the silicon-containing compound which is not dissolved but dispersed uniformly in the polyaluminoxane can be used.

An amount of the silicon-containing compound is not larger than 40% by weight in terms of silica based on the weight of silica-alumina fibers to be produced, preferably from about 1 to 40% by weight, more preferably from about 1 to 30% by weight depending on a kind of polyaluminoxane and/or a kind of the silicon-containing compound. When the amount of the silicon-containing compound exceeds 40% by weight, the heat resistance and mechanical strength of the obtained silica-alumina fibers tend to decrease.

The alkyl group of the carboxylic acid (II) has 2 to 14 carbon atoms, preferably 3 to 11 carbon atoms, more preferably 3 to 5 carbon atoms. When acetic acid is used, the spinnability and spinning stability of the spinning liquid are deteriorated, and the mechanical strength of the produced fibers fluctuates greatly. When the number of carbon atoms in the alkyl group exceeds 14, the produced silica-alumina fibers tend to be darker or to have decreased mechanical strength.

Specific examples of the carboxylic acid (II) are propionic acid, n-butyric acid, isobutyric acid, valeric acid, pivalic acid, hexanoic acid, octanoic acid, decanoic acid, lauric acid, myristic acid, and the like. Among them, branched alkyl carboxylic acids such as isobutyric acid and pivalic acid are preferred.

An amount of the aliphatic carboxylic acid is from about 0.03 to about 0.4 mole, preferably from about 0.05 to about 0.3 mole, more preferably from about 0.07 to about 0.2 mole, per one gram atom of aluminum. When the amount of the aliphatic carboxylic acid is less than 0.03 mole, the spinning stability of the spinning liquid is poor, and the mechanical strength of the produced continuous silica-alumina fibers fluctuates greatly. When the above amount exceeds 0.4 mole, the produced silica-alumina fiber tends to be darkened or to have decreased mechanical strength.

The polyaluminoxane, the silicon-containing compound and the aliphatic carboxylic acid are mixed by any of conventional methods such as mechanical agitation, gas agitation, rotary agitation, and the like, and the resulting mixture is spun.

To increase the spinnability of the spinning liquid, an organic polymer such as polyethylene glycol, polypropylene glycol, polymethyl methacrylate and the like can be added to the mixture.

The mixture should be spun under the condition that the content of the nonvolatile materials is at least 97% by weight based on the weight of the mixture at the spinning temperature. The content of the nonvolatile materials being at least 97% by weight in the mixture means that the content of the materials having boiling points at least 40° C. higher than the spinning temperature under 1 atm. is at least 97% by weight based on the weight of the mixture. When the content of the nonvolatile materials is less than 97% by weight in the spinning step, it is difficult to control the viscosity of the mixture, so that the spinning stability is deteriorated. Further, the spun mixture fibers (herein referred to as "precursor fibers") stick to each other, whereby the mechanical strength of the finally obtained silica-alumina fibers is fluctuated or decreased.

Preferably, the content of the nonvolatile materials in the mixture is at least 98% by weight.

The volatile materials such as the solvents used in the step for mixing the polyaluminoxane, the silicon-containing compound and the aliphatic carboxylic acid should be substantially removed from the mixture by, for example, condensation.

The spinning temperature is usually from about 40° C. to about 250° C., preferably from about 50° C. to about 200° C. in view of the heat stability of the polyaluminoxane.

In the spinning step, a viscosity of the mixture is adjusted according to a diameter of the intended fiber, a spinning apparatus to be used, the kind and degree of polymerization of polyaluminoxane and the like. Usually, the viscosity is from about 1 poise to about 3000 poises at the above spinning temperature.

After adjusting the temperature and viscosity by heating, the mixture is spun to form precursor fibers.

As the spinning method, any of the conventional methods such as extrusion spinning through a nozzle, centrifugal spinning, blow spinning and the like can be employed.

As a spinning head of the spinning apparatus, one having a heating mechanism at a reservoir of the spinning liquid is preferably used in view of the stable spinning.

A diameter of the precursor fiber is determined according to the intended fiber diameter. It is usually from 5 to 100 μm, preferably from 7 to 70 μm.

The precursor fibers may be stretched by a roller or a high speed air stream.

During spinning, it is preferable to adjust temperatures and humidities of a spinning atmosphere and blowing air to produce the good quality fibers stably.

The obtained precursor fibers are optionally subjected to so-called steaming, that is, treatment in a high temperature high humidity atmosphere of a temperature of at least 50° C. and a relative humidity of at least 50%, dipping treatment in water, so-called acid treatment, that is, dipping in an acid or acidic water, or a combination thereof. Then, the precursor fibers are calcined.

The calcining method is not limited to any specific method. For example, the precursor fibers may be calcined in an air, or calcined in an inert atmosphere such as nitrogen atmosphere or in vacuo and then in an oxygen-containing atmosphere.

The produced silica-alumina fibers may be further calcined in a reducing atmosphere such as hydrogen atmosphere.

The precursor fibers and/or the silica-alumina fibers may be calcined under tension.

A calcining temperature depends on the calcining method, the composition of the precursor fibers, and the like. It is usually from about 900° C. to about 1500° C. Also, the calcining time may vary with other conditions. It is usually from one second to 10 hours, preferably from 3 seconds to 5 hours.

A calcining apparatus may be any of conventional apparatuses such as an electric furnace, a gas furnace, an atmospheric furnace and the like.

The silica-alumina fiber can be obtained in the form of a continuous fiber which has a diameter of about 5 μm to about 20 μm.

According to the present invention, the silica-alumina fibers which are excellent in mechanical strength and heat resistance can be produced with good spinning stability by adding no special step to the conventional method.

PREFERRED EMBODIMENTS OF THE INVENTION

The present invention will be illustrate by the following Examples, which do not limit the scope of the present in any way.

Example 1

Isopropoxyaluminum (1 mole) was dissolved in isopropanol (100 ml) and hydrolyzed with water (1 mole) to obtain polyaluminoxane.

With this solution, isobutyric acid (0.1 mole) and polyethyl silicate of the formula:

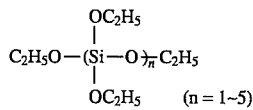

$$C_2H_5O-(Si-O)_n C_2H_5 \quad (n = 1\sim 5)$$

with $OC_2H_5$ groups on the Si.

("Ethylsilicate 40", a trade name of Tama Chemical Industries, Ltd.) (22.5 g which achieved the silica content of 15% by weight after calcining ) were mixed, and the mixture was condensed so that the content of nonvolatile materials at the spinning temperature (120° C.) reached 99% or higher.

The mixture was heated to 120° C.to achieve the viscosity of 300 poises and extruded from a nozzle extruding spinner having a spinneret which had six holes each having a diameter of 50 μm. The mixture was stably spun and a continuous homogeneous precursor fiber having a diameter of 17 μm was obtained.

The precursor fiber was steamed by keeping it in an atmosphere of 70° C. and the relative humidity of 90% for 60 minutes, and heated by a tubular furnace in air at a heating rate of 400° C./hr up to 1200° C. Then, the fiber was calcined at 1200° C. for 0.5 hours to obtain a colorless transparent silica-alumina continuous fiber.

The properties of the silica-alumina fiber are shown in the Table together with the kind and amount of the carboxylic acid, the amount of the polyethyl silicate, the content of nonvolatile materials, and spinning stability.

Example 2–11 and Comparative Examples 1–5

In the same manner as in Example 1 except that a aliphatic carboxylic acid shown in the Table and the polyethyl silicate in the amounts shown in the Table were mixed with the polyaluminoxane solution, the mixture was condensed till the content of the nonvolatile materials reached the value in the Table to obtain the spinning liquid, and it was spun, steamed and calcined to obtain a continuous silica-alumina fiber.

The properties are shown in the Table.

TABLE

| Example No. | Carboxylic acid (mole) | Polyethyl silicate*1 weight % | Content of non-volatile material | Spinning stability | Properties of silica-alumina fiber Color | Av. diameter (μm) | Tensile strength (kg/mm²) | Resisting temp. (°C.) |
|---|---|---|---|---|---|---|---|---|
| 1 | Isobutyric acid (0.10) | 15 | 99 | Excellent | Colorless transparent | 10 | 210 | 1200 |
| 2 | ↑ (0.20) | ↑ | ↑ | ↑ | ↑ | ↑ | 200 | ↑ |
| 3 | ↑ (0.30) | ↑ | ↑ | ↑ | ↑ | ↑ | 190 | ↑ |
| 4 | ↑ (0.05) | ↑ | ↑ | Good | ↑ | ↑ | 210 | ↑ |
| 5 | n-Butyric acid (0.10) | ↑ | ↑ | ↑ | ↑ | ↑ | 180 | ↑ |
| 6 | Pivalic acid (0.10) | ↑ | ↑ | Excellent | ↑ | ↑ | 210 | ↑ |
| 7 | Octanoic acid (0.10) | 15 | 99 | Excellent | Colorless transparent | 10 | 180 | 1200 |
| 8 | Lauric acid (0.10) | ↑ | ↑ | ↑ | ↑ | ↑ | 170 | ↑ |
| 9 | Isobutyric acid (0.10) | 20 | ↑ | ↑ | ↑ | ↑ | 210 | ↑ |
| 10 | ↑ | 30 | ↑ | ↑ | ↑ | 11 | 180 | 1100 |
| 11 | ↑ | 35 | 98 | Good | ↑ | ↑ | 170 | 1050 |
| C. 1 | Acetic acid (0.20) | 15 | 99 | *2 | Colorless transparent | 12 | 130 | 1150 |
| C. 2 | Isobutyric acid (0.02) | ↑ | ↑ | ↑ | ↑ | 13 | ↑ | ↑ |
| C. 3 | ↑ (0.50) | ↑ | ↑ | Good | Darkened | 11 | 110 | ↑ |
| C. 4 | Stearic acid (0.10) | ↑ | ↑ | ↑ | ↑ | ↑ | 100 | ↑ |
| C. 5 | Isobutyric acid (0.10) | 50 | ↑ | ↑ | Colorless transparent | ↑ | 140 | <1000 |
| C. 6 | ↑ (0.10) | 15 | 95 | *3 | ↑ | 10 | ↑ | 1200 |

Notes:
*1) As a content of silica in the silica-alumina fiber after sintering.
*2) Gum formation and many fiber breakages.
*3) Many fiber breakages and much sticking.

What is claimed is:

1. A method for producing silica-alumina fibers comprising steps of mixing a polyaluminoxane which comprises repeating units of the formula:

$$-\underset{X}{\underset{|}{Al}}-O- \qquad (I)$$

wherein X is an alkyl group, an alkoxy group or a hydroxy group, a silicon-containing compound in an amount of not larger than 40% by weight in terms of the silica content in the silica-alumina fibers to be produced, an aliphatic carboxylic acid of the formula:

$$RCOOH \qquad (II)$$

wherein R is an alkyl group having 3 to 11 carbon atoms in an amount of 0.03 to 0.4 mole per one gram atom of aluminum to obtain a spinning liquid, spinning the spinning liquid under a condition that a content of non-volatile materials in the liquid is maintained at least 97% by weight to form precursor fibers, and calcining the precursor fibers to obtain silica-alumina fibers.

2. The method according to claim 1, wherein said aliphatic carboxylic acid is a branched alkyl carboxylic acid.

3. The method according to claim 2, wherein said branched alkyl-carboxylic acid is isobutyric acid.

4. The method according to claim 1, wherein an amount of said aliphatic carboxylic acid is from 0.05 to 0.3 mole per one gram atom of aluminum.

5. The method according to claim 1, wherein X in the repeating units of said polyaluminoxane is an alkoxy group.

6. The method according to claim 1, wherein X in the repeating units of said polyaluminoxane is an isopropoxy group.

7. The method according to claim 1, wherein said silicon-containing compound is a polysilicate ester.

8. The method according to claim 7, wherein said polysilicate ester is a polyalklyl silicate.

9. The method according to claim 8, wherein said polyalkyl silicate is polyethyl silicate.

10. The method according to claim 1, wherein an amount of said silicon-containing compound is such that an amount of silica in the silica-alumina fiber is from 1 to 40% by weight.

11. The method according to claim 1, wherein an amount of said silicon-containing compound is such that an amount of silica in the silica-alumina fiber is from 1 to 30% by weight.

12. The method according to claim 1, wherein an amount of nonvolatile materials in said mixture is at least 98% by weight.

13. The method according to claim 1, wherein a spinning temperature is from 40° to 250° C.

14. The method according to claim 1, wherein a calcining temperature is from 900° to 1500° C.

* * * * *